United States Patent
Jinno et al.

(10) Patent No.: US 8,096,375 B2
(45) Date of Patent: Jan. 17, 2012

(54) VEHICLE AND CONTROL METHOD THEREOF

(75) Inventors: Kunihiko Jinno, Toyota (JP); Tadashi Nakagawa, Nishikamo-gun (JP); Masahiko Maeda, Nagoya (JP); Hideaki Yaguchi, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 350 days.

(21) Appl. No.: 12/522,336

(22) PCT Filed: Oct. 25, 2007

(86) PCT No.: PCT/JP2007/070820
§ 371 (c)(1),
(2), (4) Date: Jul. 7, 2009

(87) PCT Pub. No.: WO2008/084586
PCT Pub. Date: Jul. 17, 2008

(65) Prior Publication Data
US 2010/0038159 A1 Feb. 18, 2010

(30) Foreign Application Priority Data
Jan. 9, 2007 (JP) ................... 2007-001370

(51) Int. Cl.
*B60W 10/06* (2006.01)
*B60W 10/08* (2006.01)
(52) U.S. Cl. .................... 180/65.265; 701/22
(58) Field of Classification Search ............ 180/65.21, 180/65.265, 65.275, 65.28, 65.285; 903/902; 701/22, 99, 123
See application file for complete search history.

(56) References Cited

U.S. PATENT DOCUMENTS

| | | | |
|---|---|---|---|
| 6,213,233 B1 | 4/2001 | Sonntag et al. | |
| 6,228,305 B1 | 5/2001 | Okuda et al. | |
| 6,899,162 B2 | 5/2005 | Hohl et al. | |
| 7,657,351 B2* | 2/2010 | Moran | 701/22 |
| 7,672,762 B2* | 3/2010 | Matsubara | 701/22 |
| 2002/0104324 A1 | 8/2002 | Homan et al. | |
| 2006/0048982 A1 | 3/2006 | Yamamoto et al. | |

(Continued)

FOREIGN PATENT DOCUMENTS
CN 1828023 A 9/2006
(Continued)

OTHER PUBLICATIONS

Large-Scale Electrical Energy Storage; B.J. Davidson, et al., Physical Science, Measurement and Instrumentation, Management and Education, Reviews, IEE Proceedings A, vol. 127, issue 6, Jul. 1980, pp. 345-385.

(Continued)

*Primary Examiner* — John Walters
(74) *Attorney, Agent, or Firm* — Sughrue Mion, PLLC

(57) ABSTRACT

In a hybrid vehicle 20, when the ECO switch 88 is turned on, an intermittent permissive ceiling speed Vref for permitting an intermittent operation of an engine 22 is set to a second vehicle speed more than a first vehicle speed used on a turn-off condition of the ECO switch 88 (S130). The engine 22 and a motor MG2 are controlled so that a driving power equivalent to a torque demand Tr* is ensured with the intermittent operation of the engine 22 when a vehicle speed V is not more than the intermittent permissive ceiling speed Vref (S250,S270, S200-S230).

6 Claims, 9 Drawing Sheets

U.S. PATENT DOCUMENTS

| | | |
|---|---|---|
| 2007/0265762 A1 | 11/2007 | Suzuki |
| 2009/0125172 A1 | 5/2009 | Matsubara |

FOREIGN PATENT DOCUMENTS

| | | |
|---|---|---|
| CN | 100376764 C | 3/2008 |
| GB | 2450957 A | 1/2009 |
| JP | 10-212983 A | 8/1998 |
| JP | 11-122713 A | 4/1999 |
| JP | 11-180137 A | 7/1999 |
| JP | 2000-161016 A | 6/2000 |
| JP | 2000-205000 A | 7/2000 |
| JP | 2001-224105 A | 8/2001 |
| JP | 2002-188480 A | 7/2002 |
| JP | 2002-213270 A | 7/2002 |
| JP | 2004-023959 A | 1/2004 |
| JP | 2004-044469 A | 2/2004 |
| JP | 2004147379 A | 5/2004 |
| JP | 2004-222439 A | 8/2004 |
| JP | 2005-042561 A | 2/2005 |
| JP | 2005-319924 A | 11/2005 |
| JP | 2005-337173 A | 12/2005 |
| JP | 2006-074931 A | 3/2006 |
| JP | 2006-151039 A | 6/2006 |
| JP | 2006-152866 A | 6/2006 |
| JP | 2006-170128 A | 6/2006 |
| JP | 2006-321466 A | 11/2006 |
| JP | 2007-159214 A | 6/2007 |
| JP | 2008-114634 A | 5/2008 |
| JP | 2008-137518 A | 6/2008 |
| WO | 2009041138 A1 | 4/2009 |

OTHER PUBLICATIONS

Industrial Applications of Fuzzy Logic at General Electric; Piero P. Bonissone, et al., Proceedings of the IEEE, vol. 83, Issue 3, Mar. 1995, pp. 450-465, Digital Object Identifier 10.1109/5.364490.

Optimization of a Fuel-Cell EV Air-Conditioning System; C.P. Lawrence et al., Electrical and Computer Engineering, 2007. Canadian Conference on CCECE 2007, Apr. 22-26, 2007, pp. 1499-1502, Digital Object Identifier 10.1109/CCECE.2007.373.

* cited by examiner

VEHICLE AND CONTROL METHOD THEREOF

TECHNICAL FIELD

The present invention relates to a vehicle and a control method thereof. In particularly, the present invention relates to a vehicle including at least an internal combustion engine capable of outputting power for driving and a control method thereof.

BACKGROUND ART

Conventionally, there is well-known a hybrid vehicle including an engine and a motor generator capable of outputting power for driving respectively, which starts the engine and prohibits a driving under an engine stop condition when a vehicle speed exceeds a vehicle speed threshold value indicating a boundary of a region prohibiting an operation of the engine (for example, refer to Patent Document 1). In the hybrid vehicle, the vehicle speed threshold value indicating the boundary of the region prohibiting the operation of the engine is changed in accordance with a battery condition based on a battery temperature. Also, there is well-known a hybrid vehicle including an engine and a motor generator capable of outputting power for driving respectively, which drives with power only from the motor generator while stopping an operation of the engine when a vehicle speed is equal to or less than a predetermined motor drive enabling vehicle speed (for example, refer to Patent Document 2). In the hybrid vehicle, the motor drive enabling vehicle speed is controlled to be raised when a remaining capacity of a battery capable of supplying electric power to the motor generator is equal to or more than a predetermined value. In these hybrid vehicles, when the battery is in good condition or the remaining capacity of the battery is ensured, the operation stop of the engine is allowed in accordance with the vehicle speed, so that a deterioration of a drivability such as a reduction of an acceleration response due to a shortage of electric power upon starting engine under a high speed driving may slightly occur, however, fuel consumption of the engine is improve.

[Patent Document 1] Japanese Patent Laid-Open No. 2006-170128

[Patent Document 2] Japanese Patent Laid-Open No. 2004-023959

DISCLOSURE OF THE INVENTION

However, when drivers or the like wish the improvement of the fuel consumption even if the drivability slightly deteriorates, the conventional hybrid vehicles may not respond to such needs because the vehicle speed threshold value and the motor drive enabling vehicle speed are changed in accordance with the battery condition.

The present invention has an object to allow drivers to freely select whether or not giving priority to an improvement of fuel consumption of a vehicle including at least an internal combustion engine capable of outputting power for driving.

The present invention accomplishes the demand mentioned above by the following configurations applied to a vehicle and a control method thereof.

A first vehicle according to the present invention is a vehicle including: an internal combustion engine capable of outputting power for driving; a motor capable of outputting power for driving; an accumulator capable of supplying and receiving electric power from the motor; a fuel consumption priority mode selection switch to select a fuel consumption priority mode that gives priority to fuel consumption; an intermittent permissive condition setting module configured to set an intermittent permissive condition of permitting an intermittent operation of the internal combustion engine to a first condition when the fuel consumption priority mode selection switch is turned off, the intermittent permissive condition setting module setting the intermittent permissive condition to a second condition that gives priority to fuel consumption in comparison with the first condition when the fuel consumption priority mode selection switch is turned on; a driving force demand setting module configured to set a driving force demand required for driving the vehicle; and a control module configured to control the internal combustion engine and the motor so that a driving power equivalent to the set driving force demand is ensured without the intermittent operation of the internal combustion engine when the intermittent permissive condition is not satisfied, the control module controlling the internal combustion engine and the motor so that the driving power equivalent to the set driving force demand is ensured with the intermittent operation of the internal combustion engine when the intermittent permissive condition is satisfied.

In the first vehicle, the intermittent permissive condition of permitting the intermittent operation of the internal combustion engine is set to the first condition in accordance with an operation condition when the fuel consumption priority mode selection switch is turned off. The intermittent permissive condition is set to the second condition that gives priority to fuel consumption in comparison with the first condition when the fuel consumption priority mode selection switch is turned on. Then, the internal combustion engine and the motor are controlled so that the driving power equivalent to the driving force demand required for driving the vehicle is ensured without the intermittent operation of the internal combustion engine when the intermittent permissive condition is not satisfied. The internal combustion engine and the motor are controlled so that the driving power equivalent to the driving force demand is ensured with the intermittent operation of the internal combustion engine when the intermittent permissive condition is satisfied. Thus, in the first vehicle, it is possible to freely select whether or not giving priority to the improvement of fuel consumption by only operating the fuel consumption priority mode selection switch. That is, if turning off the fuel consumption priority mode selection switch, the improvement of fuel consumption is slightly limited, however, the drivability such as an acceleration response is favorably ensured. On the other hand, if turning on the fuel consumption priority mode selection switch, the drivability slightly deteriorates, however, the fuel consumption is favorably improved.

The first vehicle may further include a vehicle speed detecting unit that detects a vehicle speed of the vehicle. The intermittent permissive condition setting module may set an intermittent permissive ceiling speed that is a ceiling speed permitting the intermittent operation of the internal combustion engine to a first vehicle speed when the fuel consumption priority mode selection switch is turned off, the intermittent permissive condition setting module setting the intermittent permissive ceiling speed to a second vehicle speed more than the first vehicle speed when the fuel consumption priority mode selection switch is turned on. The control module may control the internal combustion engine and the motor so that the driving power equivalent to the set driving force demand is ensured without the intermittent operation of the internal combustion engine when the detected vehicle speed is more than the intermittent permissive ceiling speed, the control module controlling the internal combustion engine and the motor so that the driving power equivalent to the set driving force demand is ensured with the intermittent operation of the internal combustion engine when the detected vehicle speed is not more than the intermittent permissive ceiling speed. Thus, when the fuel consumption priority mode selection switch is turned on, the intermittent operation of the internal combustion engine is permitted even if the vehicle speed increases within the second vehicle speed, so that fuel consumption of the internal combustion engine can be improved.

The above vehicle may include a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side. In this case, the power transmitting mechanism may be an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator. The electric power-mechanical power input output structure may include a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts, and the motor may be capable of outputting power to the predetermined axle or another axle different from the predetermined axle. The power transmitting mechanism may be a continuously variable transmission.

A second vehicle according to the present invention is a vehicle including an internal combustion engine capable of outputting power for driving, the vehicle including: a braking unit configured to generating a braking force in response to a driver's braking demand operation; a braking force demand setting module configured to set a braking force demand that is demanded by the braking demand operation; a fuel consumption priority mode selection switch to select a fuel consumption priority mode that gives priority to fuel consumption; an intermittent permissive condition setting module configured to set an intermittent permissive condition of permitting an intermittent operation of the internal combustion engine to a first condition when the fuel consumption priority mode selection switch is turned off, the intermittent permissive condition setting module setting the intermittent permissive condition to a second condition that gives priority to fuel consumption in comparison with the first condition when the fuel consumption priority mode selection switch is turned on; and a control module configured to control braking unit so that the set braking force demand is ensured without stopping an operation of the internal combustion engine when the intermittent permissive condition is not satisfied at the braking demand operation, the control module controlling the braking unit so that the set braking force demand is ensured with stopping the operation of the internal combustion engine when the intermittent permissive condition is satisfied at the braking demand operation.

In the second vehicle, the intermittent permissive condition of permitting the intermittent operation of the internal combustion engine is set to the first condition when the fuel consumption priority mode selection switch is turned off. The intermittent permissive condition is set to the second condition that gives priority to fuel consumption in comparison with the first condition when the fuel consumption priority mode selection switch is turned on. Then, the internal combustion engine and the motor are controlled so that the braking force demand that is demanded by the braking demand operation is ensured without stopping an operation of the internal combustion engine when the intermittent permissive condition is not satisfied at the braking demand operation. The internal combustion engine and the motor are controlled so that the braking force demand is ensured with stopping the operation of the internal combustion engine when the intermittent permissive condition is satisfied at the braking demand operation. Thus, in the second vehicle, it is possible to freely select whether or not giving priority to the improvement of fuel consumption by only operating the fuel consumption priority mode selection switch. That is, if turning off the fuel consumption priority mode selection switch, the improvement of fuel consumption is slightly limited, however, the drivability such as an acceleration response after the braking demand operation is favorably ensured. On the other hand, if turning on the fuel consumption priority mode selection switch, the drivability slightly deteriorates, however, the fuel consumption (energy efficiency) is favorably improved by reducing a loss due to an engine friction upon reducing the vehicle speed.

A first control method of a vehicle according to the present invention is a control method of a vehicle including an internal combustion engine capable of outputting power for driving, a motor capable of outputting power for driving, an accumulator capable of supplying and receiving electric power from the motor, and a fuel consumption priority mode selection switch to select a fuel consumption priority mode that gives priority to fuel consumption, the method including the steps of:

(a) setting an intermittent permissive condition of permitting an intermittent operation of the internal combustion engine to a first condition when the fuel consumption priority mode selection switch is turned off, and setting the intermittent permissive condition to a second condition that gives priority to fuel consumption in comparison with the first condition when the fuel consumption priority mode selection switch is turned on; and (b) controlling the internal combustion engine and the motor so that a driving power equivalent to a driving force demand required for driving the vehicle is ensured without the intermittent operation of the internal combustion engine when the intermittent permissive condition is not satisfied, and controlling the internal combustion engine and the motor so that the driving power equivalent to the driving force demand is ensured with the intermittent operation of the internal combustion engine when the intermittent permissive condition is satisfied.

According to the first method, it is possible to freely select whether or not giving priority to the improvement of fuel consumption by only operating the fuel consumption priority mode selection switch. That is, if turning off the fuel consumption priority mode selection switch, the improvement of fuel consumption is slightly limited, however, the drivability such as an acceleration response is favorably ensured. On the other hand, if turning on the fuel consumption priority mode selection switch, the drivability slightly deteriorates, however, the fuel consumption is favorably improved.

In the first method, the step (a) may set an intermittent permissive ceiling speed that is a ceiling speed permitting the intermittent operation of the internal combustion engine to a first vehicle speed when the fuel consumption priority mode selection switch is turned off, and sets the intermittent permissive ceiling speed to a second vehicle speed more than the first vehicle speed when the fuel consumption priority mode selection switch is turned on, and the step (b) may control the internal combustion engine and the motor so that the driving power equivalent to the driving force demand is ensured without the intermittent operation of the internal combustion engine when the detected vehicle speed is more than the intermittent permissive ceiling speed, and controls the internal combustion engine and the motor so that the driving power equivalent to the set driving force demand is ensured with the intermittent operation of the internal combustion engine when the detected vehicle speed is not more than the intermittent permissive ceiling speed.

A second control method of a vehicle according to the present invention is a control method of a vehicle including an internal combustion engine capable of outputting power for driving, a braking unit configured to generating a braking force in response to a driver's braking demand operation, and a fuel consumption priority mode selection switch to select a fuel consumption priority mode that gives priority to fuel consumption, the method including the steps of:

(a) setting an intermittent permissive condition of permitting an intermittent operation of the internal combustion engine to a first condition when the fuel consumption priority mode selection switch is turned off, and setting the intermittent permissive condition to a second condition that gives priority to fuel consumption in comparison with the first condition when the fuel consumption priority mode selection switch is turned on; and (b) controlling the braking unit so that a braking force demand that is demanded by the braking demand operation is ensured without stopping an operation of the internal combustion engine when the intermittent permissive condition is not satisfied at the braking demand operation, and controlling the braking unit so that the braking force demand is ensured with stopping the operation of the internal combustion engine when the intermittent permissive condition is satisfied at the braking demand operation.

According to the second method, it is possible to freely select whether or not giving priority to the improvement of fuel consumption by only operating the fuel consumption priority mode selection switch. That is, if turning off the fuel consumption priority mode selection switch, the improvement of fuel consumption is slightly limited, however, the drivability such as an acceleration response after the braking demand operation is favorably ensured. On the other hand, if turning on the fuel consumption priority mode selection switch, the drivability slightly deteriorates, however, the fuel consumption (energy efficiency) is favorably improved by reducing a loss due to an engine friction upon reducing the vehicle speed.

In the second method, the step (a) may set an intermittent permissive ceiling speed that is a ceiling speed permitting the intermittent operation of the internal combustion engine to a first vehicle speed when the fuel consumption priority mode selection switch is turned off, and sets the intermittent permissive ceiling speed to a second vehicle speed more than the first vehicle speed when the fuel consumption priority mode selection switch is turned on, and the step (b) may control the internal combustion engine and the motor so that the driving power equivalent to the driving force demand is ensured without the intermittent operation of the internal combustion engine when the detected vehicle speed is more than the intermittent permissive ceiling speed, and controls the internal combustion engine and the motor so that the driving power equivalent to the set driving force demand is ensured with the intermittent operation of the internal combustion engine when the detected vehicle speed is not more than the intermittent permissive ceiling speed.

BEST MODES FOR CARRYING OUT THE INVENTION

Now, the best mode for carrying out the present invention will be described with reference to an embodiment.

Figure 1:
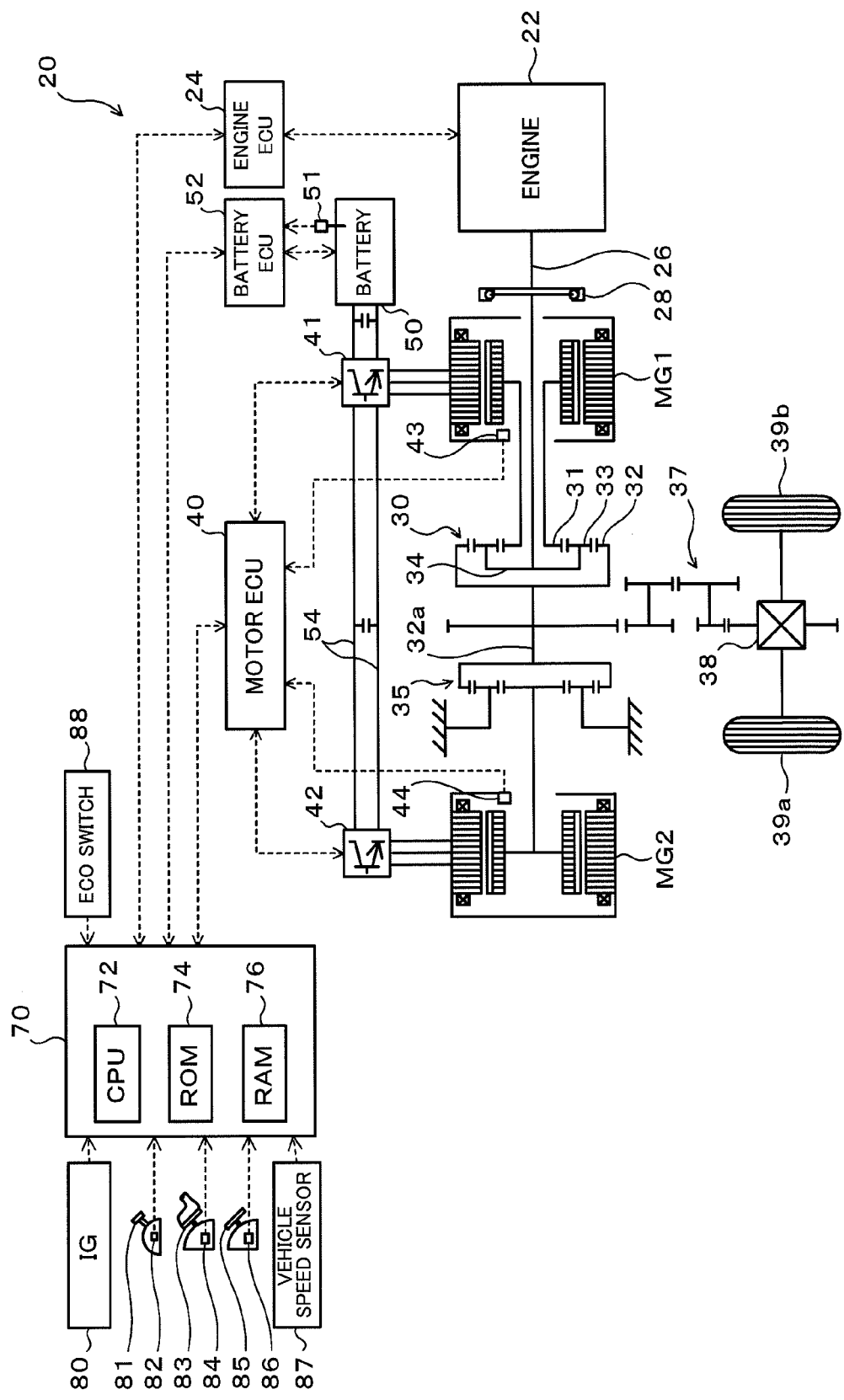
FIG. 1 is a schematic block diagram of a hybrid vehicle 20 according to an embodiment of the present invention.

FIG. 1 schematically illustrates the configuration of a hybrid vehicle 20 in one embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (fuel consumption priority mode selection switch) 88 to select, as a control mode at a time of driving, an ECO mode (fuel consumption priority mode) that gives priority to fuel consumption over drivability is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation.

Figure 2:
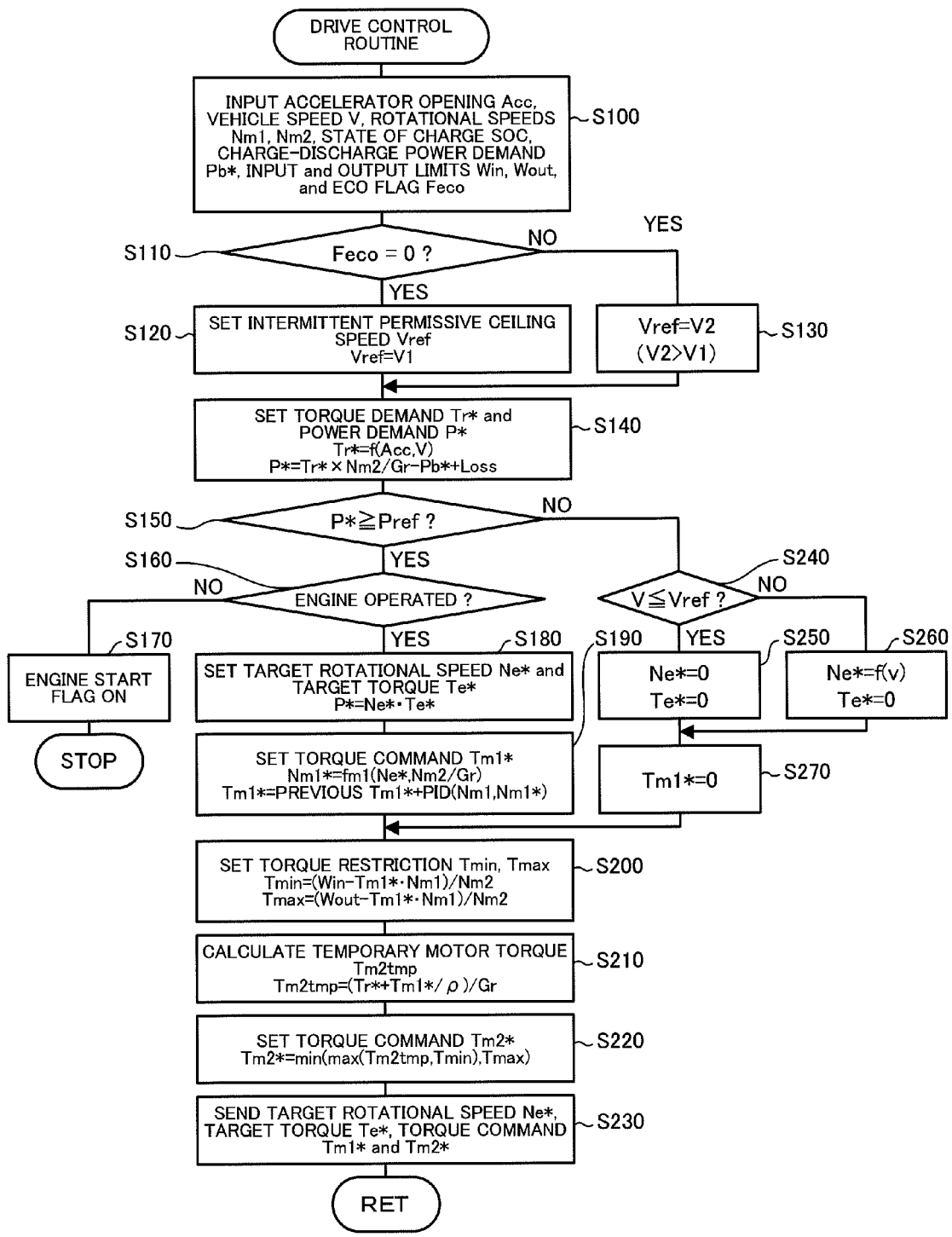
FIG. 2 is a flowchart illustrating an example of a drive control routine executed by a hybrid electric control unit 70 in the embodiment.

Next, the operation of the hybrid vehicle 20 with the above configuration will be described. FIG. 2 is a flowchart illustrating an example of a drive control routine that is executed by the hybrid ECU 70 at predetermined time intervals (for example, at ever several msec).

At start of the drive control routine in FIG. 2, the CPU 72 of the hybrid ECU 70 executes input processing of data required for control such as the accelerator opening Acc from the accelerator pedal position sensor 84, the vehicle speed V from the vehicle speed sensor 87, the rotational speeds Nm1, Nm2 of the motors MG1, MG2, the state of charge SOC of the battery 50, a charge-discharge power demand Pb*, an input limit Win that is an allowable charging electric power to be charged into the battery 50 and an output limit Wout that is an allowable discharging electric power to be discharged from the battery 50, and a value of the ECO flag Feco (Step S100). The rotational speeds Nm1 and Nm2 of the motors MG1 and MG2 are input from the motor ECU 40 by communication. The state of charge SOC of the battery 50 is input from the battery ECU 52 by communication. The charge-discharge power demand Pb* is set as electric power for charging or discharging the battery 50 according to the state of charge SOC of the battery 50 and the like by the battery ECU 52 and is input from the battery ECU 52 by communication. The input limit Win and the output limit Wout are set based on the battery temperature Tb of the battery 50 and the state of charge SOC of the battery 50 and are input from the battery ECU 52 by communication. After the data input at Step S100, the CPU 72 determines whether or not the input ECO flag Feco is value "0", that is, whether or not the ECO switch 88 is turned off (Step S110). When the ECO switch 88 is turned off and the value of the ECO flag Feco is value "0", the CPU 72 sets an intermittent permissive ceiling speed Vref that is an upper limit of the vehicle speed V permitting the intermittent operation for operating or stopping the engine 22 according to the operation condition to a first vehicle speed V1 (Step S120). In the embodiment, the first vehicle speed V1 is a speed selected within a range from 50-70 km/h for example. On the other hand, when the ECO switch 88 is turned on and the value of the ECO flag Feco is value "1", the CPU 72 sets the intermittent permissive ceiling speed Vref to a second vehicle speed V2 (Step S130). In the embodiment, the second vehicle speed V2 is a speed selected within a range from 80-90 km/h for example.

Figure 3:
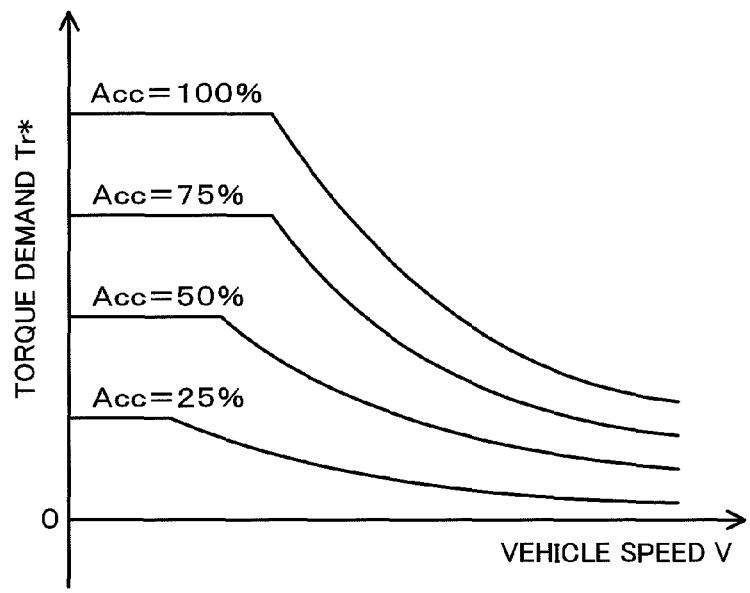
FIG. 3 is a view illustrating an example of a torque demand setting map.

After setting the intermittent permissive ceiling speed Vref, the CPU 72 sets a torque demand Tr* to be output to the ring gear shaft 32a or the axle connected to drive wheels 39a and 39b based on the input accelerator opening Acc and the input vehicle speed V, and sets a power demand P* required for whole of the vehicle (Step S140). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 3 illustrates an example of the torque demand setting map. In the embodiment, the power demand P* is calculated as the sum of a product of the set torque demand Tr* and a rotational speed Nr of the ring gear shaft 32a, the charge-discharge power demand Pb* (where positive values represent discharge demands), and a potential loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k. Then, the CPU 72 determines whether or not the set power demand P* is equal to or more than a predetermined threshold value Pref (Step S150). When the power demand P* is equal to or more than the threshold value Pref, the CPU 72 considers the power demand P* to be output from the engine 22 and determines whether or not the engine 22 is operated (Step S160). When the operation of the engine 22 is stopped, the CPU 72 sets an engine start flag to instruct an execution of a drive control routine for starting the engine that is not shown (Step S170) and terminates the routine. A detailed description of the drive control routine for starting the engine is omitted because it does not form a core of the invention.

Figure 4:
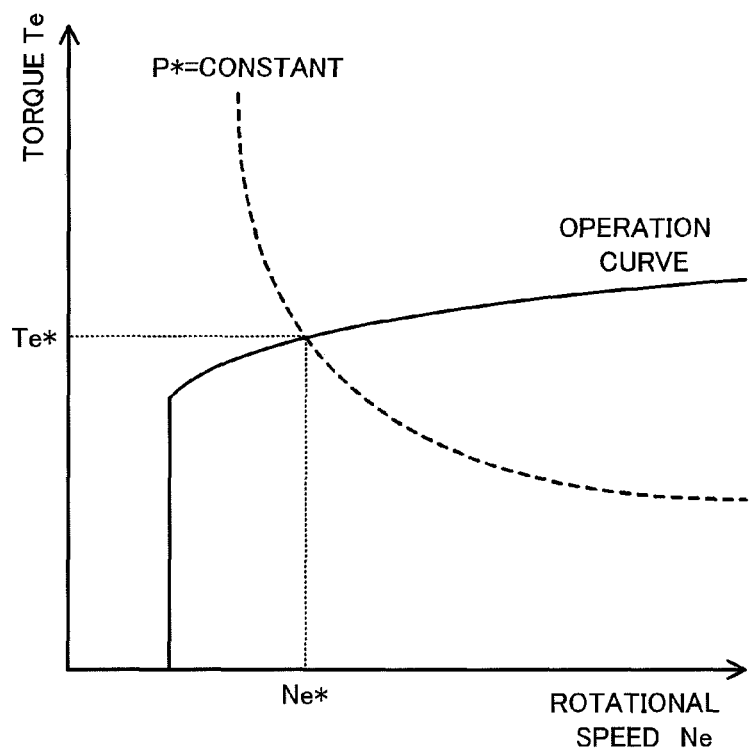
FIG. 4 is a view illustrating an operation curve of the engine 22 and a correlation curve between a target rotational speed Ne* and a target torque Te*.
Figure 5:
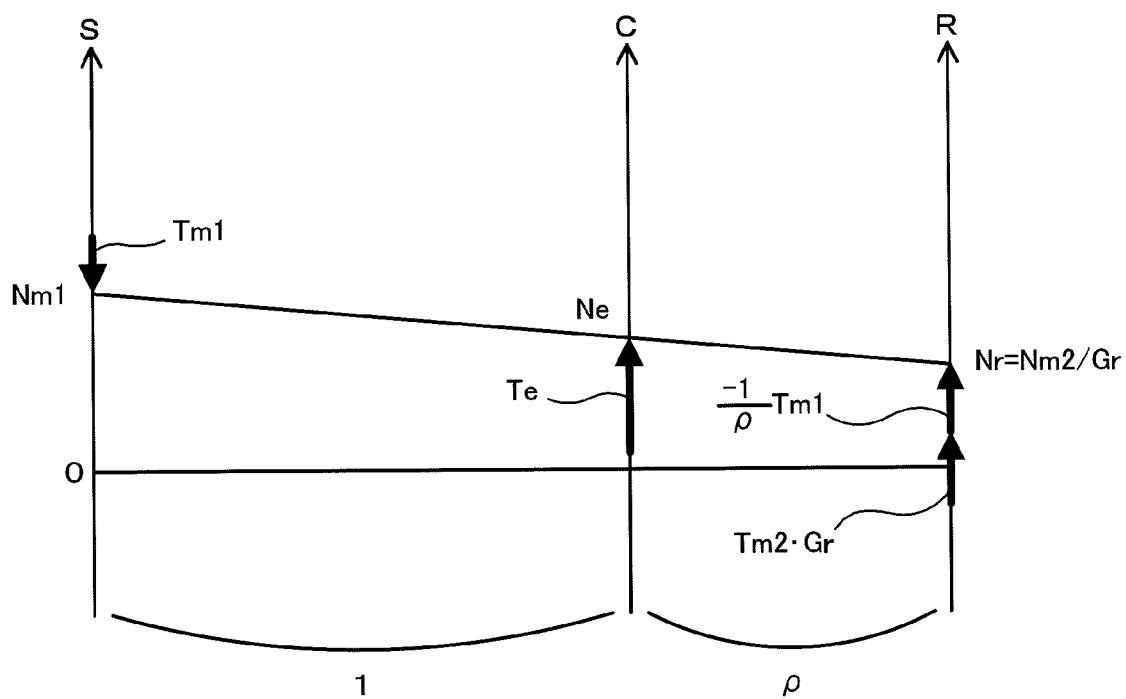
FIG. 5 is a view illustrating an alignment chart showing a dynamic relationship between a rotational speed and torque of each rotating element of a power distribution and integration mechanism 30.

When determining that the engine 22 is operated at Step S160, the CPU 72 sets a target rotational speed Ne* and a target torque Te* as a target drive point of the engine 22 so that the engine 22 is operated with high efficiency, based on the power demand P* set at Step S140 (Step S180). In the embodiment, the target rotational speed Ne* and the target torque Te* of the engine 22 are set based on a predetermined operation curve for operating the engine 22 with high efficiency and the power demand P*. FIG. 4 illustrates the operation curve of the engine 22 and a correlation curve between the target rotational speed Ne* and the target torque Te*. As shown in FIG. 4, the target rotational speed Ne* and the target torque Te* can be obtained from an intersection between the operation curve and the correlation curve indicating a constant power demand P* (Ne*×Te*). After setting the target rotational speed Ne* and the target torque Te* of the engine 22, the CPU 72 calculates a target rotational speed Nm1* of the motor MG1 from the set target rotational speed Ne*, the rotational speed Nr (=Nm2/Gr) of the ring gear shaft 32a, and a gear ratio ρ of the power distribution integration mechanism 30 (a quotient of the number of teeth of the sun gear 31 by the number of teeth of the ring gear 32) according to Equation (1) given below. Then, CPU 72 computes a torque command Tm1* of the motor MG1 by calculation of below Equation (2) based on the calculated target rotational speed Nm1* and a current rotational speed Nm1 of the motor MG1 (Step S190). Equation (1) is a dynamic relational expression of respective rotational elements included in the power distribution integration mechanism 30. FIG. 5 illustrates an alignment chart showing torque-rotational speed dynamics of the respective rotational elements included in the power distribution integration mechanism 30. In FIG. 5, the left axis 'S' represents a rotational speed of the sun gear 31 that is equivalent to the rotational speed Nm1 of the motor MG1, the middle axis 'C' represents a rotational speed of the carrier 34 that is equivalent to the rotational speed Ne of the engine 22, and the right axis 'R' represents the rotational speed Nr of the ring gear 32 obtained by dividing the rotational speed Nm2 of the motor MG2 by the gear ratio Gr of the reduction gear 35. Two thick arrows on the axis 'R' respectively show torque applied to the ring gear shaft 32a by output of the torque Tm1 from the motor MG1, and torque applied to the ring gear shaft 32a via the reduction gear 35 by output of the torque Tm2 from the motor MG2. Equation (1) for computation of the target rotational speed Nm1* of the motor MG1 is readily obtained by taking into account the rotational speed relation in the alignment chart. Equation (2) is a relational expression of feedback control to drive and rotate the motor MG1 at the target rotational speed Nm1*. In Equation (2) given above, 'k1' in the second term and 'k2' in the third term on the right side respectively denote a gain of the proportional and a gain of the integral term.

$$Nm1^* = Ne^* \cdot (1+\rho)/\rho - Nm2/(Gr \cdot \rho) \qquad (1)$$

$$Tm1^* = \text{last } Tm1^* + k1(Nm1^* - Nm1) + k2\int(Nm1^* - Nm1)dt \qquad (2)$$

After computation of the torque command Tm1* of the motor MG1 at Step S190, the CPU 72 calculates a lower torque restriction Tmin and an upper torque restriction Tmax as allowable minimum and maximum torques to be output from the motor MG2 according to the following equations (3) and (4) by dividing a deviation between the output limit Wout or the input limit Win of the battery 50 and power consumption of the motor MG1 that is a product of the torque command Tm1* and the current rotational speed Nm1 of the motor MG1 by the rotational speed Nm2 of the motor MG2 (Step S200). Next, the CPU 72 calculates a temporary motor torque Tm2tmp as a torque value to be output from the motor MG2, based on the torque demand Tr*, the torque command Tm1*, the gear ratio ρ of the power distribution integration mechanism 30, and the gear ratio Gr of the reduction gear 35 according to Equation (5) given below (Step S210). Then, the CPU 72 sets a torque command Tm2* of the motor MG2 to a value obtained by limiting the calculated temporary motor torque Tm2tmp by the lower and the upper torque restrictions Tmin and Tmax (Step S220). Setting the torque command Tm2* of the motor MG2 in this manner restricts the torque to be output to the ring gear shaft 32a or the axle in the range of the input limit Win and the output limit Wout of the battery 50. Equation (5) is readily introduced from the alignment chart of FIG. 5. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S230) and returns to Step S100 to repeat the processing of and after Step S100. The engine ECU 24 receives the target rotational speed Ne* and the target torque Te* and performs control to obtain the target rotational speed Ne* and the target torque Te*. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$T\text{min} = (Win - Tm1^* \cdot Nm1)/Nm2 \qquad (3)$$

$$T\text{max} = (Wout - Tm1^* \cdot Nm1)/Nm2 \qquad (4)$$

$$Tm2tmp = (Tr^* + Tm1^*/\rho)/Gr \qquad (5)$$

On the other hand, when determining that the power demand P* is less than the threshold value Pref, the CPU 72 determines whether or not the vehicle speed V input at Step S100 is equal to or more than the intermittent permissive ceiling speed Vref (Step S240). When the vehicle speed V is equal to or less than the intermittent permissive ceiling speed Vref, the CPU 72 sets the target rotational speed Ne* and the target torque Te* as the target drive point of the engine 22 to value "0" respectively (Step S250) so as to stop the operation of the engine 22. Further, the CPU 72 sets the torque command Tm1* for the motor MG1 to value "0" (Step S270) and executes the processing of and after Step S200. Thus, in the embodiment, the hybrid vehicle 20 can be driven with power from the motor MG2 because the intermittent operation of the engine 22 is allowed if the vehicle speed V is equal to or less than the intermittent permissive ceiling speed Vref when the power demand P* required for whole of the vehicle is relatively low. Further, in the embodiment, the intermittent operation of the engine 22 is allowed when the vehicle speed V is equal to or less than the intermittent permissive ceiling speed Vref even if the vehicle speed V increases to some extent because the intermittent permissive ceiling speed Vref is set to the second vehicle speed V2 larger than the first vehicle speed V1 of the turn-off condition of the ECO switch 88 when the ECO switch 88 is turned on. When determining that the vehicle speed V is more than the intermittent permissive ceiling speed Vref at Step S240, the CPU 72 does not allow the intermittent operation of the engine and sets the target rotational speed Ne* to an autonomous rotational speed according to the vehicle speed V based on an autonomous rotational speed setting map (not shown) so that the engine 22 is autonomously operated not to substantially output torque, and sets the torque command Tm1* for the motor MG1 to value "0" (Step S260). Then, the CPU 72 executes the processing of Step S270 and after Step S200.

As has been described above, in the hybrid vehicle 20 of the embodiment, the intermittent permissive ceiling speed Vref as the intermittent permissive condition of permitting the intermittent operation of the engine 22 is set to the first vehicle speed (first condition) when the ECO switch 88 is turned off (Step S120). The intermittent permissive ceiling speed Vref as the intermittent permissive condition is set to the second vehicle speed V2 (second condition) larger than the first vehicle speed V1 so as to give priority to fuel consumption when the ECO switch 88 is turned on (Step S130). Then, the engine 22, the motors MG1 and MG2 are controlled so that the driving power equivalent to the torque command Tr* is ensured without the intermittent operation of the engine 22 when the intermittent permissive condition is not satisfied, that is, when the vehicle speed V is more than the intermittent permissive ceiling speed Vref (Steps S260, S270, and S200-S230). The engine 22, the motors MG1 and MG2 are controlled so that the driving power equivalent to the torque command Tr* is ensured with the intermittent operation of the engine 22 when the intermittent permissive condition is satisfied, that is, when the vehicle speed V is equal to or less than the intermittent permissive ceiling speed Vref (Steps S250, S270, and S200-S230). Thus, in the hybrid vehicle 20, it is possible to freely select whether or not giving priority to the improvement of fuel consumption by only operating the ECO switch 88. That is, if turning off the ECO switch 88, the improvement of fuel consumption is slightly limited, however, the drivability such as an acceleration response is favorably ensured. On the other hand, if turning on the ECO switch 88, the drivability slightly deteriorates, however, the fuel consumption is favorably improved. Further, in the embodiment, the intermittent operation of the engine 22 is allowed when the vehicle speed V is equal to or less than the intermittent permissive ceiling speed Vref even if the vehicle speed V increases to some extent because the intermittent permissive ceiling speed Vref is set to the second vehicle speed V2 larger than the first vehicle speed V1 of the turn-off condition of the ECO switch 88 when the ECO switch 88 is turned on, so that the fuel consumption can be favorably improved.

Figure 6:
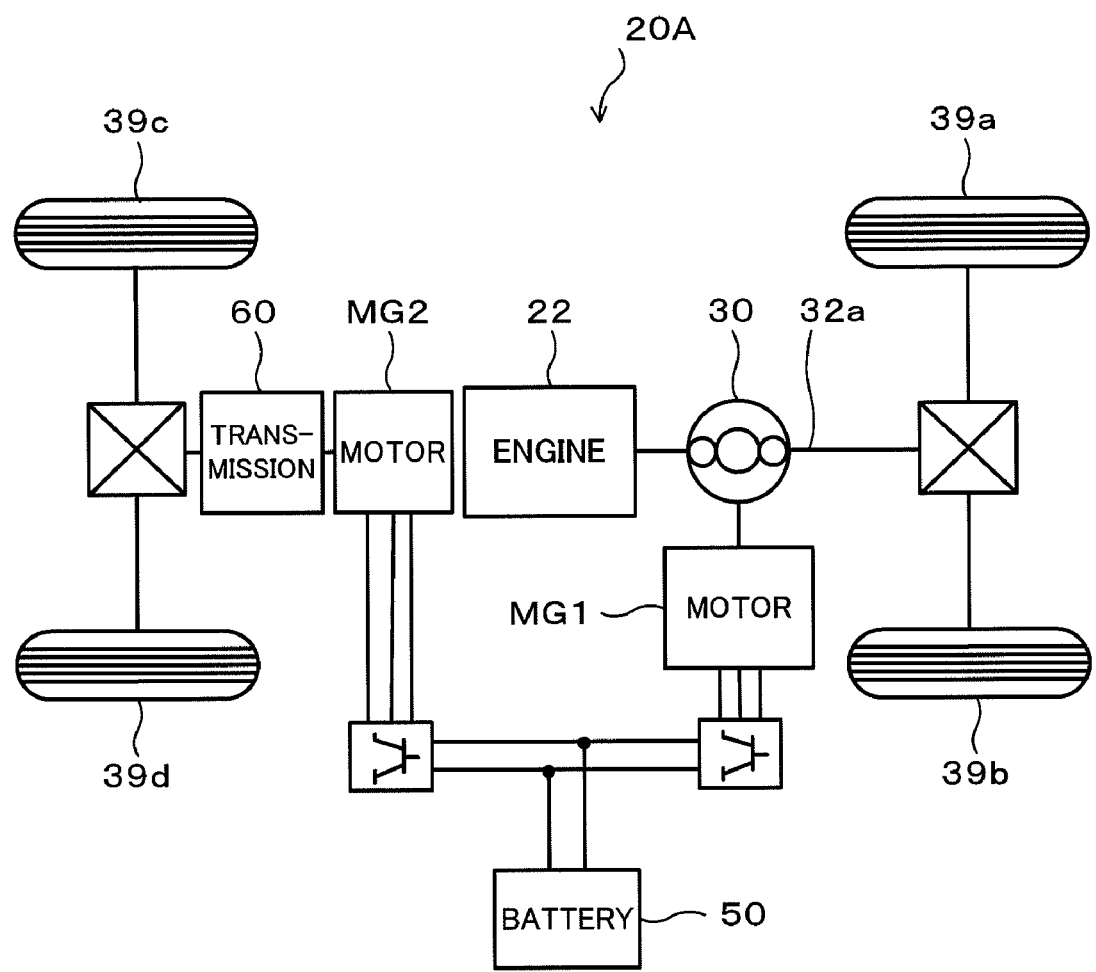
FIG. 6 is a schematic block diagram of a hybrid vehicle 20A according to a modification of the present invention.
Figure 7:
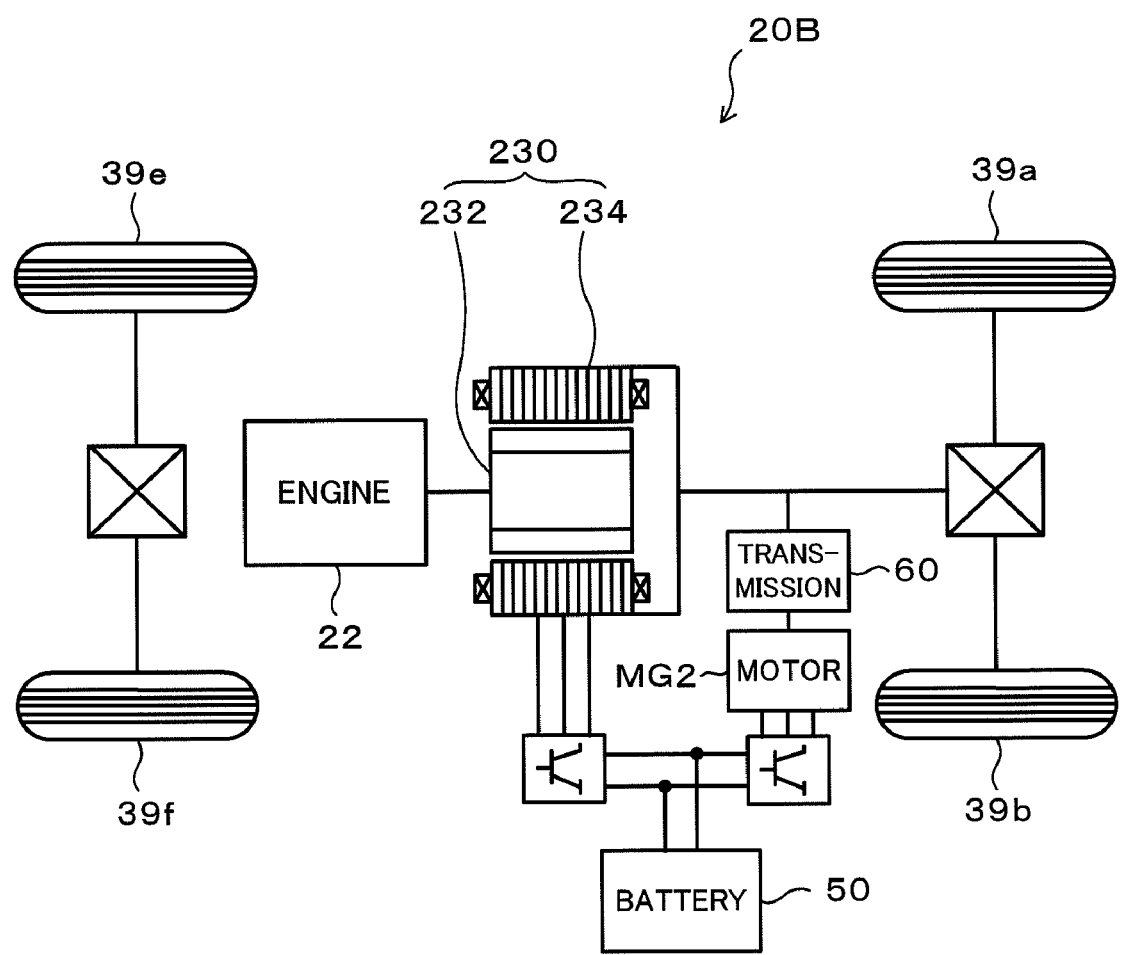
FIG. 7 is a schematic block diagram of a hybrid vehicle 20B according to a further modification of the present invention.
Figure 8:
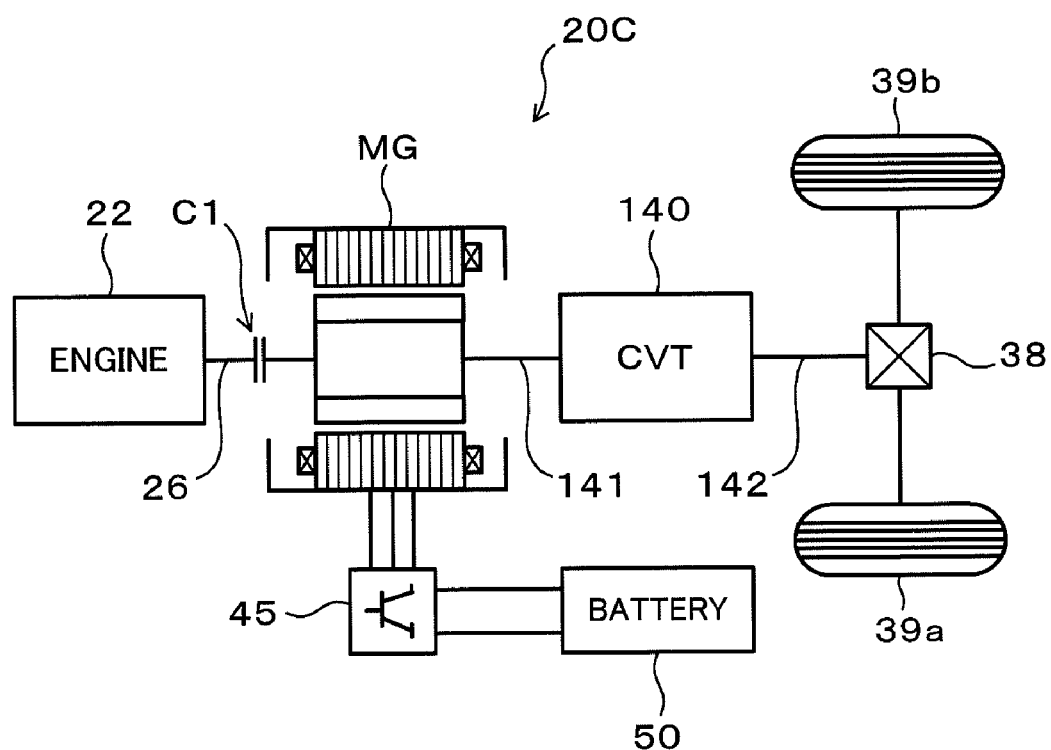
FIG. 8 is a schematic block diagram of a hybrid vehicle 20C according to a still further modification of the present invention.

Although the hybrid vehicle 20 of the above described embodiment is a vehicle that outputs the power of the motor MG2 to an axle connected to the ring gear shaft 32a, an object for application of the present invention is not limited thereto. More specifically, as in the case of a hybrid vehicle 20A as a modification example shown in FIG. 6, the present invention may also be applied to a vehicle in which the power of the motor MG2 is output to an axle (axle connected to wheels 39c and 39d in FIG. 6) that is different from the axle (axle to which the wheels 39a and 39b are connected) that is connected to the ring gear shaft 32a. Further, although the hybrid vehicle 20 of the above described embodiment is a vehicle that outputs the power of the engine 22 to the ring gear shaft 32a as an axle connected to the wheels 39a and 39b via the power distribution and integration mechanism 30, an object for application of the present invention is not limited thereto. More specifically, as in the case of a hybrid vehicle 20B as a modification example shown in FIG. 7, the present invention may also be applied to a vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power. Further, the present invention may also be applied to a hybrid vehicle 20C as a modification example shown in FIG. 8. In the hybrid vehicle shown in FIG. 8, the crank shaft 26 of the engine and the motor MG (rotor) that is a synchronous motor are connected each other through a clutch C1 and the motor MG is connected to an input shaft 141 of an automatic transmission such as a continuously variable transmission (hereinafter, referred to as "CVT") 140. Power from an output shaft 142 of the automatic transmission 140 is finally output to the drive wheels 39a and 39b through the differential gear 38.

Figure 9:
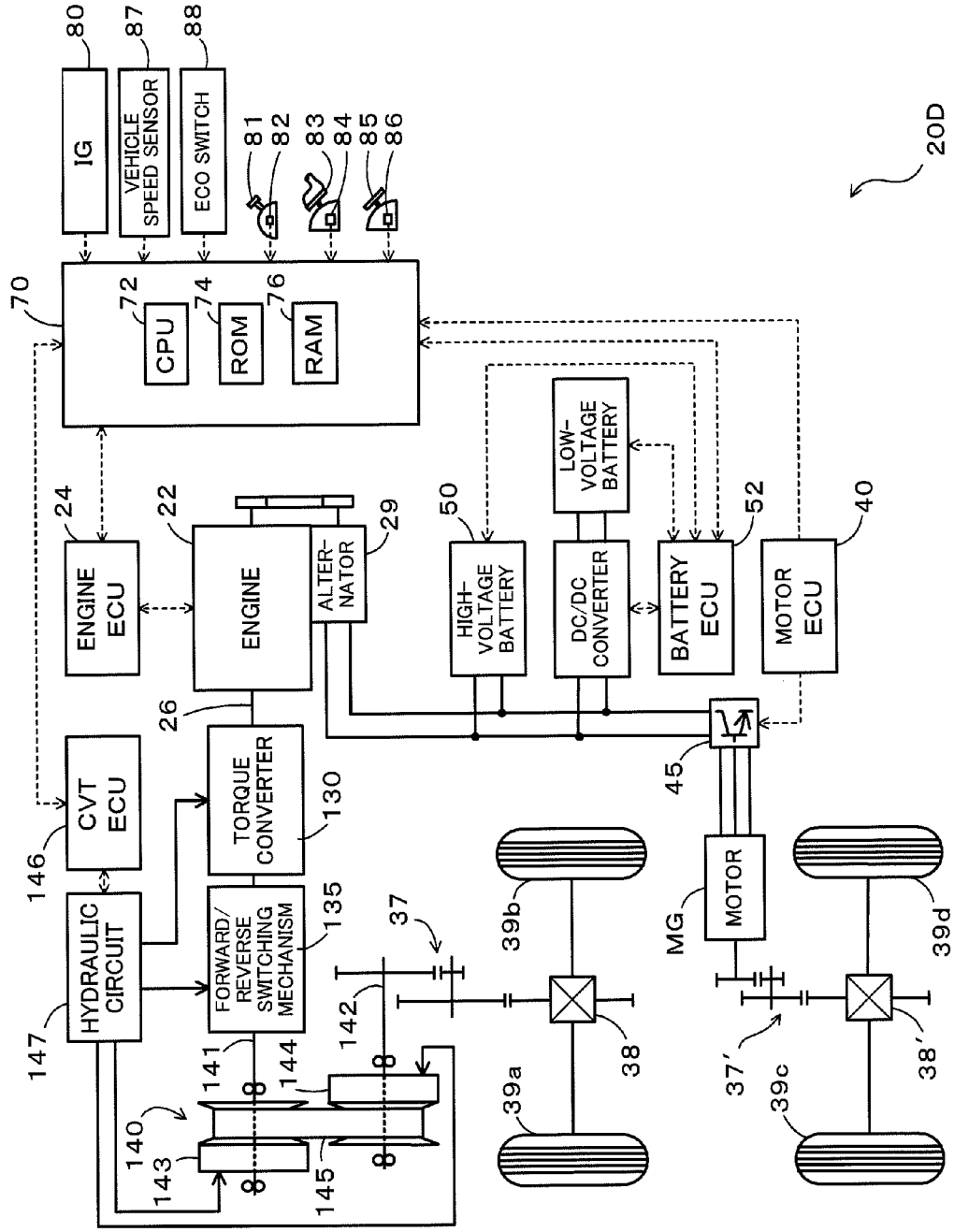
FIG. 9 is a schematic block diagram of a hybrid vehicle 20D according to a still further modification of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 20D that is one example of this kind of vehicle is illustrated in FIG. 9. The hybrid vehicle 20D as a modification example shown in FIG. 9 includes a front-wheel drive system that outputs the power from the engine 22 to, for example, wheels 39a and 39b that are front wheels via a torque converter 130, a forward/reverse switching mechanism 135, a belt-type CVT 140, a gear mechanism 37, a differential gear 38, and the like, a rear-wheel drive system that outputs power from a motor MG that is a synchronous motor generator to, for example, wheels 39c and 39d that are rear wheels via a gear mechanism 37', a differential gear 38' and the like, and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20D shown in FIG. 9 instead of the belt-type CVT 140. The motor MG is connected to an alternator 29 that is driven by the engine 22 via an inverter 45, and is connected to a battery (high-voltage battery) 50 having an output terminal connected to a power line from the alternator 29. Thus, the motor MG is driven by power from the alternator 29 or the battery 50, and performs regeneration to charge the battery 50 with electric power that is generated thereby. The hybrid vehicle 20D constructed in this manner drives by outputting mainly power from the engine 22 to the wheels 39a and 39b that are front wheels in accordance with an operation of the accelerator pedal 83 by the driver, and, as necessary, drives by four-wheel driving in which, in addition to outputting the power to the wheels 39a and 39b, power from the motor MG is output to the wheels 39c and 39d that are the rear wheels.

Figure 10:
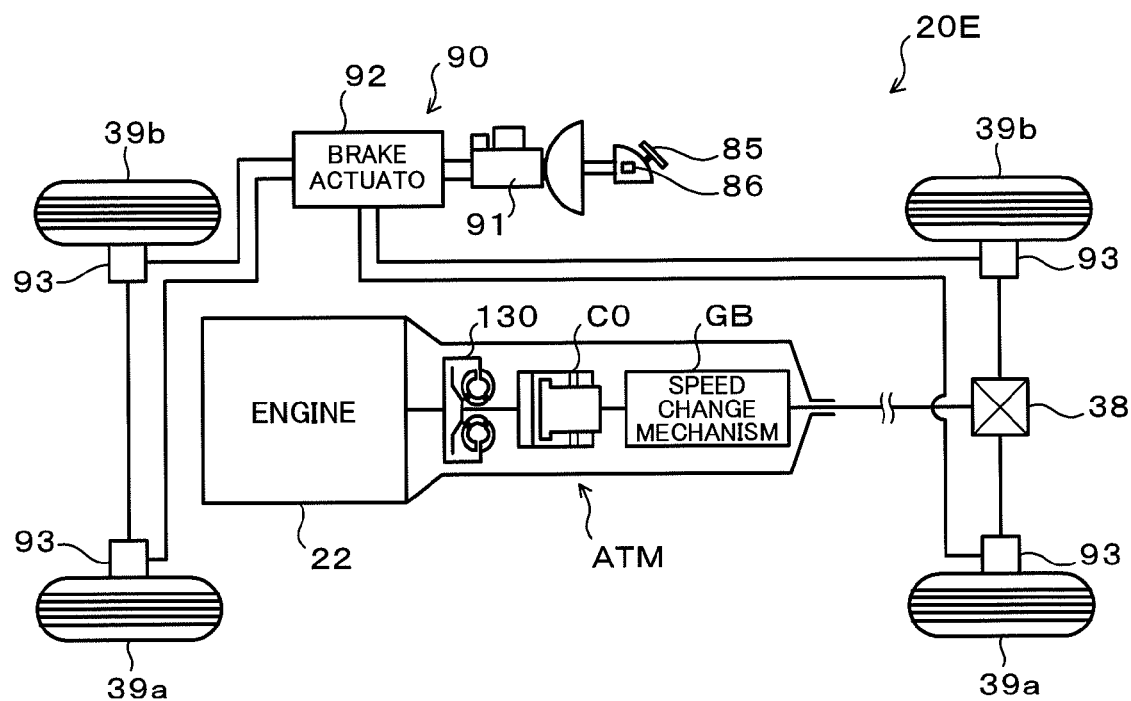
FIG. 10 is a schematic block diagram of a vehicle 20E according to a modification of the present invention.

Further, the present invention may also be applied to a typical vehicle 20E exemplified in FIG. 10 that includes an automatic transmission ATM including the torque converter 130, a clutch C0 as a torque transmitting device that is constructed as a multi plates clutch for example, and a speed change mechanism GB, the engine 22, a brake unit 90 including a master cylinder 91, a brake actuator 92, wheel cylinders 93 and the like and generating a braking force in response to a driver's braking demand operation, the ECO switch (not shown). In the vehicle 20E shown in FIG. 10, an intermittent permissive ceiling speed Vref as an intermittent permissive condition of permitting the intermittent operation of the engine 22 is set to a first vehicle speed V1 (first condition) when the ECO switch 88 is turned off. The intermittent permissive ceiling speed Vref as the intermittent permissive condition is set to the second vehicle speed V2 (second condition) larger than the first vehicle speed V1 so as to give priority to fuel consumption when the ECO switch 88 is turned on. Then, in the vehicle 20E, a brake electronic control unit (not shown) controls the brake unit 90 so that a braking force equivalent to an operation amount of the brake pedal 85 (braking force demand) is ensured without stopping the operation of the engine 22 when the intermittent permissive condition is not satisfied at an operation of the brake pedal 85 by the driver, that is, when the vehicle speed V is more than the intermittent permissive ceiling speed Vref at the operation of the brake pedal 85. When the intermittent permissive condition is satisfied at the operation of the brake pedal 85 by the driver, that is, when the vehicle speed V is equal to or less than the intermittent permissive ceiling speed Vref at the operation of the brake pedal 85, the brake electronic control unit controls the brake unit 90 so that the braking force equivalent to the operation amount of the brake pedal 85 is ensured with stopping the operation of the engine 22. Thus, in the vehicle 20E, it is possible to freely select whether or not giving priority to the improvement of fuel consumption by only operating the ECO switch 88. That is, if turning off the ECO switch 88, the improvement of fuel consumption is slightly limited, however, the drivability such as an acceleration response after a release of the operation of the brake pedal 85 is favorably ensured. On the other hand, if turning on the ECO switch 88, the drivability slightly deteriorates, however, the fuel consumption is favorably improved by reducing a loss due to an engine friction upon reducing the vehicle speed. In the vehicle shown in FIG. 10, the engine 22 is restarted at the release of the operation of the brake pedal 85 by the drive.

The correlation between the principal elements of the embodiments and modification examples, and the principal elements of the invention described in the "Disclosure of the Invention" section will now be described. That is, in the above described embodiment and modification examples, the engine 22 capable of outputting power to the ring gear shaft 32a and the like corresponds to "internal combustion engine", the motors MG and MG2 correspond to "motor", the battery 50 corresponds to "accumulator", the ECO switch 88 to select the ECO mode giving priority to fuel consumption rather than the drivability corresponds to "fuel consumption priority mode selection switch", and the hybrid ECU 70 and the like executing the drive control routine shown in FIG. 2 corresponds to "intermittent permissive condition setting module", "driving force demand setting module", and "control module". Further, the power distribution integration mechanism 30 including the ring gear 32 as the axle-side rotational element and the carrier 34 as the engine-side rotational element, the CVT 140 including the input shaft 141 as the engine-side rotational element and the output shaft 142 as the axle-side rotational element, and the pair-rotor motor 230 correspond to "power transmitting mechanism", a combination of the motor MG1 and the power distribution integration mechanism 30, and the pair-rotor motor 230 correspond to "electric power-mechanical power input output structure", the motor MG1, the alternator 29 and the pair-rotor motor 230 correspond to "power generation motor", and the power distribution integration mechanism 30 corresponds to "three shaft-type power input output assembly". Further, the vehicle 20E corresponds to "second vehicle". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of vehicles.

The invention claimed is:

1. A vehicle comprising:
an internal combustion engine capable of outputting power for driving;
a motor capable of outputting power for driving;
an accumulator capable of supplying and receiving electric power from the motor;
a fuel consumption priority mode selection switch to select a fuel consumption priority mode that gives priority to fuel consumption;
an engine operation stop condition setting module configured to set an engine operation stop condition of permitting an operation stop of the internal combustion engine to a condition where a vehicle speed is not more than a first vehicle speed when the fuel consumption priority mode selection switch is turned off, the engine operation stop condition setting module setting the engine operation stop condition to a condition where the vehicle speed is not more than a second vehicle speed more than the first vehicle speed when the fuel consumption priority mode selection switch is turned on;
a driving force demand setting module configured to set a driving force demand required for driving the vehicle; and
a controller configured to control the internal combustion engine and the motor so that a driving power equivalent to the set driving force demand is ensured without the operation stop of the internal combustion engine when the engine operation stop condition is not satisfied, the controller controlling the internal combustion engine and the motor so that the driving power equivalent to the set driving force demand is ensured with the operation stop of the internal combustion engine when the engine operation stop condition is satisfied.

2. A vehicle according to claim 1, further comprising:
a power transmitting mechanism having an axle-side rotational element connected to a predetermined axle, and an engine-side rotational element connected to an engine shaft of the internal combustion engine and configured to differentially rotate with respect to the axle-side rotational element, the power transmitting mechanism capable of outputting at least a part of power from the engine shaft to the axle side.

3. A vehicle according to claim 2, wherein the power transmitting mechanism is an electric power-mechanical power input output structure connected to the predetermined axle and the engine shaft of the internal combustion engine and outputting at least a part of power from the internal combustion engine to the axle side with input/output of electric power and mechanical power, the electric power-mechanical power input output structure supplying and receiving electric power from the accumulator.

4. A vehicle according to claim 3, wherein the electric power-mechanical power input output structure includes a power generation motor capable of inputting and outputting power, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts, and wherein the motor is capable of outputting power to the predetermined axle or another axle different from the predetermined axle.

5. A vehicle according to claim 2, wherein the power transmitting mechanism is a continuously variable transmission.

6. A control method of a vehicle including an internal combustion engine capable of outputting power for driving, a motor capable of outputting power for driving, an accumulator capable of supplying and receiving electric power from the motor, and a fuel consumption priority mode selection switch to select a fuel consumption priority mode that gives priority to fuel consumption, the method comprising the steps of:

(a) setting an engine operation stop condition of permitting an operation stop of the internal combustion engine to a condition where a vehicle speed is not more than a first vehicle speed when the fuel consumption priority mode selection switch is turned off, the step (a) setting the engine operation stop condition to a condition where the vehicle speed is not more than a second vehicle speed more than the first vehicle speed when the fuel consumption priority mode selection switch is turned on; and (b) controlling the internal combustion engine and the motor so that a driving power equivalent to a driving force demand required for driving the vehicle is ensured without the operation stop of the internal combustion engine when the engine operation stop condition is not satisfied, the step (b) controlling the internal combustion engine and the motor so that the driving power equivalent to the driving force demand is ensured with the operation stop of the internal combustion engine when the engine operation stop condition is satisfied.

* * * * *